US00RE33960E

United States Patent [19]

Neuman

[11] E Patent Number: Re. 33,960

[45] Reissued Date of Patent: Jun. 16, 1992

[54] REFRIGERATOR DOOR AJAR DETECTION SYSTEM

[75] Inventor: Charles E. Neuman, Dayton, Ohio

[73] Assignee: Neuman Industries, Inc., Delphos, Ohio

[21] Appl. No.: 706,012

[22] Filed: May 28, 1991

Related U.S. Patent Documents

Reissue of:

[64] Patent No.: 4,891,626
Issued: Jan. 2, 1990
Appl. No.: 298,031
Filed: Jan. 18, 1989

[51] Int. Cl.[5] ..... G08B 21/00

[52] U.S. Cl. ..... 340/547; 49/13; 62/131; 200/61.62; 200/61.69; 340/529

[58] Field of Search ..... 340/547, 686, 529; 200/61.62, 61.69; 62/131; 49/13

[56] References Cited

U.S. PATENT DOCUMENTS

| | | | |
|---|---|---|---|
| 2,957,320 | 10/1960 | Armentrout | 62/274 |
| 3,880,476 | 6/1975 | Canter et al. | 303/119 |
| 3,895,198 | 7/1975 | Piber | 200/61.62 |
| 3,986,183 | 10/1976 | Fujiwara | 340/547 |
| 4,160,972 | 7/1979 | La Mell et al. | 340/541 |
| 4,241,337 | 12/1980 | Prada | 340/547 |
| 4,278,968 | 7/1981 | Arnett et al. | 340/545 |
| 4,463,348 | 7/1984 | Sidebottom | 340/529 |
| 4,528,558 | 7/1985 | Steers et al. | 340/686 |
| 4,661,805 | 4/1987 | Sälzer | 340/547 |
| 4,691,195 | 9/1987 | Sigelman et al. | 200/61.62 |
| 4,806,910 | 2/1989 | Sälzer | 340/547 |

*Primary Examiner*—Glen R. Swann, III
*Attorney, Agent, or Firm*—Killworth Gottman Hagan & Schaeff

[57] ABSTRACT

A door status detection system is provided for use in a refrigerator having a cabinet defining first and second food storage compartments and corresponding first and second doors hingely mounted to the cabinet for selectively closing the compartments. The doors each include a magnetic sealing strip secured thereto for sealing the doors to the cabinet and for maintaining the doors in closed position. First and second switch arrays are installed into the cabinet generally adjacent a section of the magnetic sealing strips of the first and second doors, respectively, when the doors are in closed position for signaling the opened/closed status of the doors. The first and second switch arrays are electrically connected in series and operated by the magnetic sealing strips of the doors. Circuitry is connected to the first and second switch arrays for signaling a user of the refrigerator if either of the doors remains in an opened position for a defined period of time. The first and second switch arrays each comprise two reed switches electrically connected in parallel and angularly oriented relative to the sealing strips to accommodate a positional range of the strips relative to the cabinet. Alternately, the first and second switch arrays may comprise Hall Effect switches preferably mounted along an axis which is angularly oriented relative to the strips to effect a staggered relation of the Hall Effect switches relative to the strips.

33 Claims, 4 Drawing Sheets

REFRIGERATOR DOOR AJAR DETECTION SYSTEM

Matter enclosed in heavy brackets [ ] appears in the original patent but forms no part of this reissue specification; matter printed in italics indicates the additions made by reissue.

BACKGROUND OF THE INVENTION

The present invention relates generally to the detection of refrigerator doors which have been left open and, more particularly, to a refrigerator door status detection system which is operated by magnetic door sealing strip to signal a user of the refrigerator if a refrigerator door has been left open for a defined period of time.

Detection of the opened/closed status of refrigerator doors is required for the proper operation of a refrigerator incorporating the doors. For example, a blower motor for circulating air within the refrigerator should be operated only while the refrigerator doors are closed to maximize refrigerating efficiency. Similarly, lights for illuminating the food storage compartments of a refrigerator should be turned on only when an associated compartment door is open, otherwise the desired refrigeration temperature may be impossible to maintain. A system for performing these functions is disclosed in U.S. Pat. No. 2,957,320 issued to Armentrout and comprises a switch which is controlled by the force of gravity and by a magnetic field produced by a magnetic door sealing gasket or strip.

Detection of the opened/closed status of refrigerator doors is also beneficial to detect when such doors inadvertently have been allowed to remain open after use of the refrigerator. This detection problem has been addressed in the prior art, for example in U.S. Pat. Nos. 4,241,337 issued to Prada, 4,278,968 issued to Arnett et al, and 4,463,348 issued to Sidebottom.

Prada discloses a system wherein refrigerators are protected by a device which comprises a magnetic sensing switch mounted into the edge of one door and a magnet mounted adjacent the magnetic sensing switch in a kick panel or in the edge of a second door of a two door refrigerator. Whenever the door or one of the two doors is opened, a door ajar signal is activated to visually or audibly alert a user of the refrigerator. Arnett et al. discloses a system wherein a housing including a buzzer and a proximity switch is connected to a wall, for example jof a walk-in freezer, and a magnetic element is secured to an associated door opposite to the proximity switch. Whenever the door is opened, a timer is activated to generate a pulse having a duration equal to an allowed door-open period. Upon detecting the end of the pulse together with continued door-open status, the buzzer is activated. Sidebottom discloses a door monitoring system wherein conventional push button, rocker, or reed switches mounted on a refrigerator of the doors of a refrigerator are monitored to generate visual indicia of the degree of door usage.

Ideally, a refrigerator door ajar system would take advantage of magnetic door sealing gaskets or strips which have been in wide spread use for many years as evidenced by the Armentrout patent. Unfortunately, no commercially successful refrigerator door ajar system based on sensing the magnetic fields generated by the sealing strips has been produced to this time. Such failure is potentially due to the complicated and hence expensive switches which have been used, for example as shown in Armentrout. An additional hindrance to the development of a magnetic strip sensing system has been the tolerances which are present in the manufacture of refrigerators and the extended life of current day refrigerators in particular, the manufacturing tolerances and potential door sag over the life of a refrigerator allow the positioning of refrigerator doors to vary such that the related positioning of the magnetic sealing strips of the doors can vary by as much as 0.5 inch. Such variations may result in unreliable operation of existing detectors, require detectors which are too expensive to be commercially acceptable or require periodic adjustment which may be difficult, unreliable or impossible in itself and, in any event, is unacceptable both to the consumer and to the manufacturer.

Since none of the prior art systems have gained substantial commercial acceptance in spite of the apparently desireable features of eliminating excessive energy usage and protecting stored food from spoiling, it is apparent that there is a need for an improved door status detection system for use in a refrigerator for sensing a door which remains open for a defined period of time. Such a system must be inexpensive, reliable over time and preferably would be operated from the magnetic sealing strip which is provided on substantially all refrigerator doors.

SUMMARY OF THE INVENTION

This need is met by a refrigerator door status detection system in accordance with the present invention wherein switch array means are provided to accommodate variations in the location of refrigerator door magnetic sealing strips relative to the cabinet of the refrigerator due to manufacturing tolerances and door sag which can occur as a refrigerator ages. The switch array means is operated by the magnetic field of an associated portion of a sealing strip and provides a range of sensing which spans the outermost limits of tolerable location changes of the magnetic sealing strips to thereby provide reliable door status detection over the substantial lifetime of current day refrigerators and in spite of manufacturing tolerances.

The switch array means may comprise at least two reed switches which are electrically connected in parallel and positioned such that at least one of the reed switches will be activated by a magnetic door sealing strip despite variations in the positioning of the strip. If the reed switches are angularly oriented relative to the sealing strip, it has been determined that two reed switches will suffice; however, other orientations or numbers of parallel connected reed switches can be used in the present invention. The switch array means may also comprise at least two Hall Effect switches which are electrically connected in parallel. If three Hall Effect switches are use, the switches can be aligned along an axis which is then angularly oriented relative to the sealing strip. Preferably, an oscilator and storage device are associated with the switch array means to operate signal means upon the first one of a periodically occurring series of pulses which are generated by the oscillator to alert a user of the refrigerator of a door or doors which remain open for a defined period of time.

In accordance with one aspect of the present invention, a door status detection system is provided for use in a refrigerator having a cabinet defining a food storage compartment and a door hingedly mounted to the cabinet for selectively closing the compartment. The door includes a magnetic sealing strip secured thereto for sealing the door to the cabinet and for maintaining the door in a closed position. The door status detection system comprises switch array means installed into the cabinet generally adjacent a section of the magnetic sealing strip when the door is in a closed position for signaling the opened/closed status of the door. The switch array means is operated by the magnetic sealing strip and circuit means connected to the switch array means provides for signaling a user of the refrigerator if the door remains in an opened position for a defined period of time.

The switch array means may comprise at least two reed switches electrically connected in parallel with one another, positioned side-by-side and generally axially aligned with the magnetic sealing strip to accommodate a positional range of the door and accordingly the magnetic sealing relative to the cabinet. Preferably, the at least two reed switches are positioned substantially parallel to one another. The circuit means may comprise signal means for alerting a person in the vicinity of the refrigerator that the door has been open for a defined period of time, storage means connected to the signal means for activating the signal means upon receipt of a first one of a periodically occurring series of signal activation pulses, and oscillator means for generating the series of signal activation pulses having a period corresponding to the defined period of time. The oscillator means is connected to and activated by the switch array means upon opening of the door. The storage means preferably comprises a flip-flop circuit which is cleared by the switch array means upon opening of the door and set by the first one of the periodically occurring series of signal activation pulses generated by the oscillator means. The switch array means may also comprise at least two reed switches electrically connected in parallel with one another, positioned adjacent one another and angularly oriented relative to the magnetic sealing strip to accommodate a positional range of the door and accordingly the magnetic sealing strip relative to the cabinet. Preferably, the at least two reed switches are positioned substantially parallel to one another.

Alternately, the switch array means may comprise at least two Hall Effect switches electrically connected in parallel with one another. The at least two Hall Effect switches are staggered relative to a nominal centerline of the magnetic sealing strip to accommodate a positional range of the door and accordingly the magnetic sealing strip relative to the cabinet. Preferably, the at least two Hall Effect switches are aligned with one another along an axis which is angularly oriented relative to effect the staggered relation of the Hall Effect switches relative thereto.

In accordance with one another aspect of the present invention, a door status detection system is provided for use in a refrigerator having a cabinet defining first and second food storage compartments and corresponding first and second doors hingedly mounted to the cabinet for selectively closing the first and second compartments, respectively. The doors each include a magnetic sealing strip secured thereto for sealing the doors to the cabinet and for maintaining the doors in closed positions. The door status detection system comprises first and second switch array means installed into the cabinet generally adjacent a section of the magnetic sealing strips of the first and second doors, respectively, when the doors are in closed positions for signaling the opened/closed status of the doors. The first and second switch array means are electrically connected in series and operated by the magnetic sealing strips of the first and second doors, respectively, and circuit means are connected to the first and second switch array means for signaling a user of the refrigerator if either of the door remains in an opened position for a defined period of time.

The first and second switch array means may each comprise at least two reed switches electrically connected in parallel with one another, positioned side-by-side and generally axially aligned with the magnetic sealing strips of the first and second doors to accommodate a positional range of the doors and accordingly the corresponding magnetic sealing strips relative to the cabinet. Alternately, the first and second switch array means may each comprise at least two Hall Effect switches electrically connected in parallel with one another. The at least two Hall Effect switches of the first and second switch array means are staggered relative to nominal centerlines of the magnetic sealing strips of the first and second doors to accommodate a positional range of the doors and accordingly the corresponding magnetic sealing strips relative to the cabinet.

It is thus an object of the present invention to provide an improved door status detection system for use in a refrigerator and operable by a magnetic door sealing strip for sensing a door which remains open for a defined period of time and for alerting a user of the refrigerator of the open door; to provide an improved door status detection system for use in a refrigerator for sensing a door which remains open for a defined period of time and for alerting a user of the refrigerator of the open door wherein switch array means are positioned opposite a magnetic door sealing strip to provide reliable operation of the system in spite of changes in the location of the door due to manufacturing tolerances and/or sag which can occur over the substantial operating lifetime of a refrigerator; and, to provide an improved door status detection system for use in a refrigerator for sensing a door which remains open for a defined period of time and for alerting a user of the refrigerator of the open door wherein at least two reed switches or Hall Effect switches are electrically connected in parallel and positioned to span the outermost limits of the possible location changes of a magnetic door sealing strip to thereby provide reliable door status detection over the substantial lifetime of current day refrigerators and in spite of manufacturing tolerances.

Other objects and advantages of the invention will be apparent from the following description, the accompanying drawings and the appended claims.

DETAILED DESCRIPTION OF THE INVENTION

Figure 1:
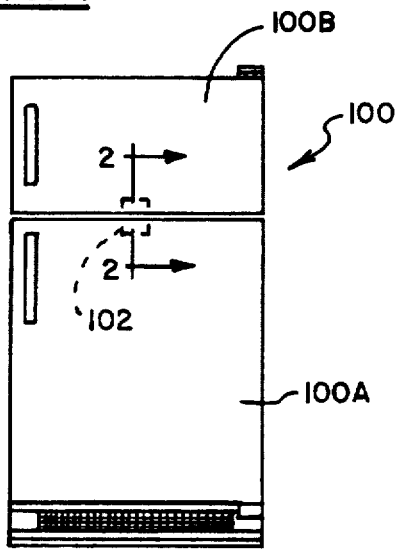
FIG. 1 is a front view of a two door refrigerator-freezer showing the location of a sensing element of a refrigerator door ajar detection system in accordance with the present invention.

Reference is now made to the drawing figures wherein FIG. 1 illustrates a two door refrigerator 100 showing the general location of a sensing element 102 operable in the door status detection system of the present invention. The sensing element 102 is centrally located between the sides of the refrigerator 100 such that it operates properly with the doors 100A, 100B hinged to either side of the refrigerator 100. Although the refrigerator 100 includes hingedly mounted refrigerator compartment door 100A and freezer compartment door 100B which are vertically oriented relative to one another, it will be apparent that the present invention is equally applicable to a refrigerator having doors which are mounted side-by-side.

Figure 2:
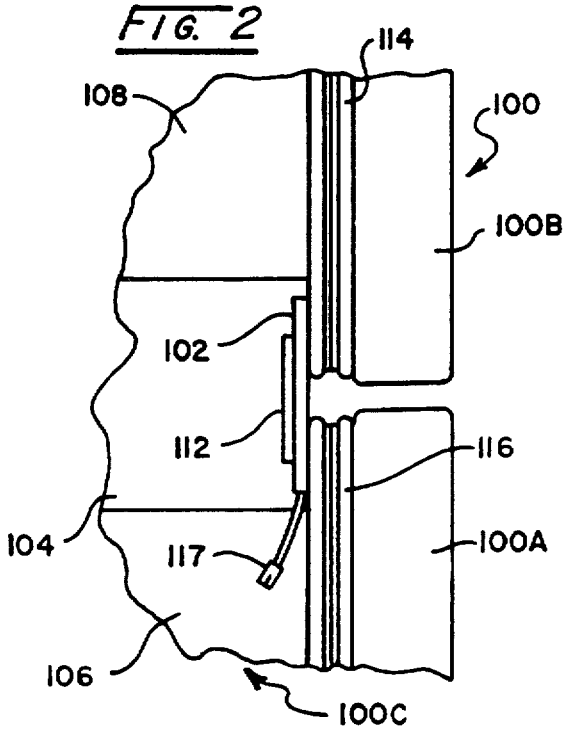
FIG. 2 is a partially sectioned side view of the sensing element area of the refrigerator of FIG. 1 taken along the section line 2—2.
Figure 3:
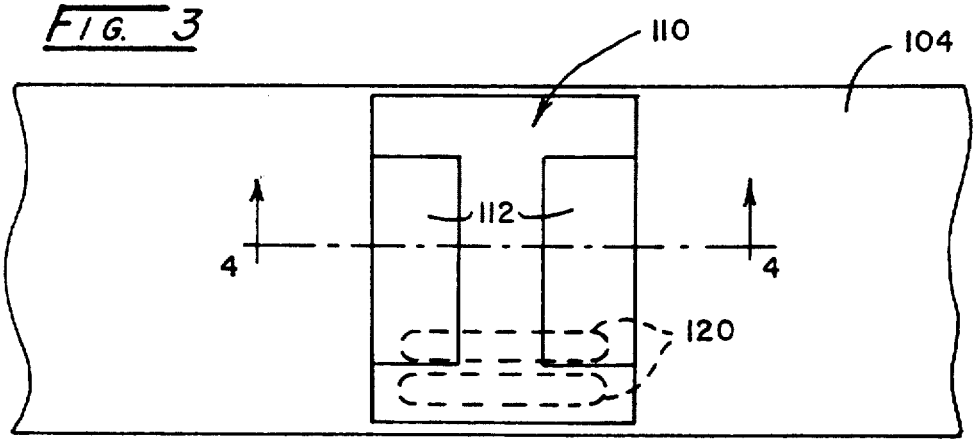
FIG. 3 is a broken away front view of the section of the refrigerator cabinet separating the refrigerator compartment from the freezer compartment showing the mounting opening which receives the sensing element of the present invention.
Figure 4:
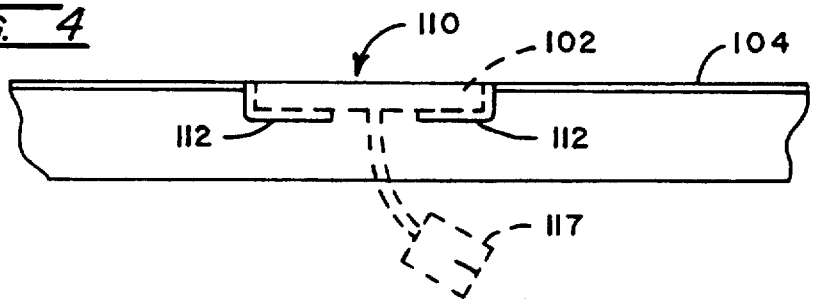
FIG. 4 is a sectional view of the mounting opening of FIG. 3 taken along the second line 4—4.

The mounting arrangement of the sensing element 102 is best shown in FIGS. 2-4 which illustrate a horizontal structural member 104 of a refrigerator cabinet 100C which separates a refrigerator compartment 106 from a freezer compartment 108. The structural member 104, sometimes referred to as a mullion, is typically formed of sheet metal which can be readily stamped during manufacture to define a mounting opening 110 which receives the sensing element 102. The back of the mounting opening 110 is defined by a pair of sensing element retaining fingers 112 formed during the stamping operation which created the opening 110. Preferably the sensing element 102 is potted in a plastic housing which is received in the opening 110 and retained therein by a friction fit. Of course, the sensing element 102 can be glued or otherwise retained within the opening 110. Once in place, the sensing element 102 is covered, for example by a pressure sensitive decal or other easily cleaned yet removable cover.

Figure 8:
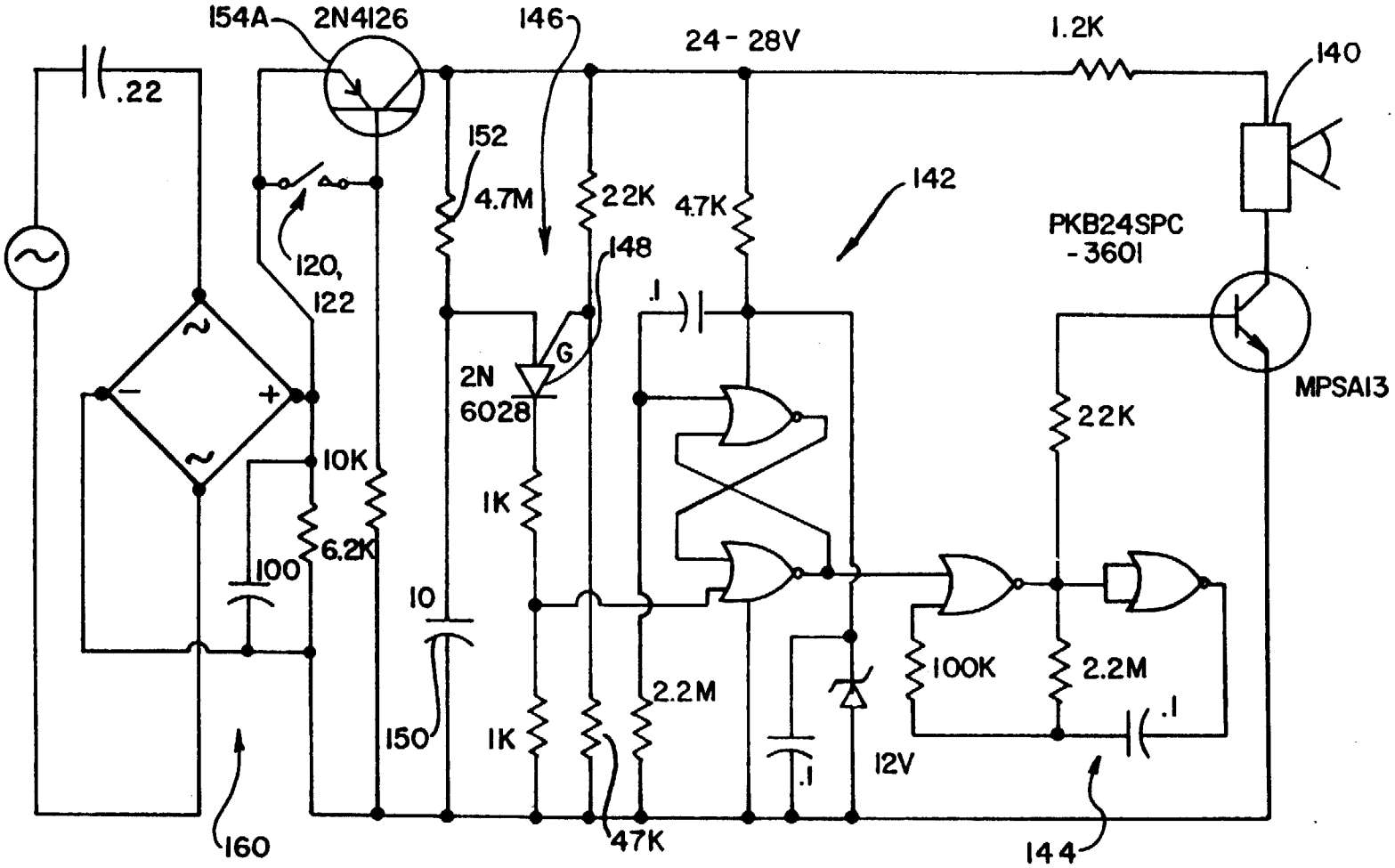
FIG. 8 is a schematic circuit diagram operable with the sensing element of FIG. 5.
Figure 9:
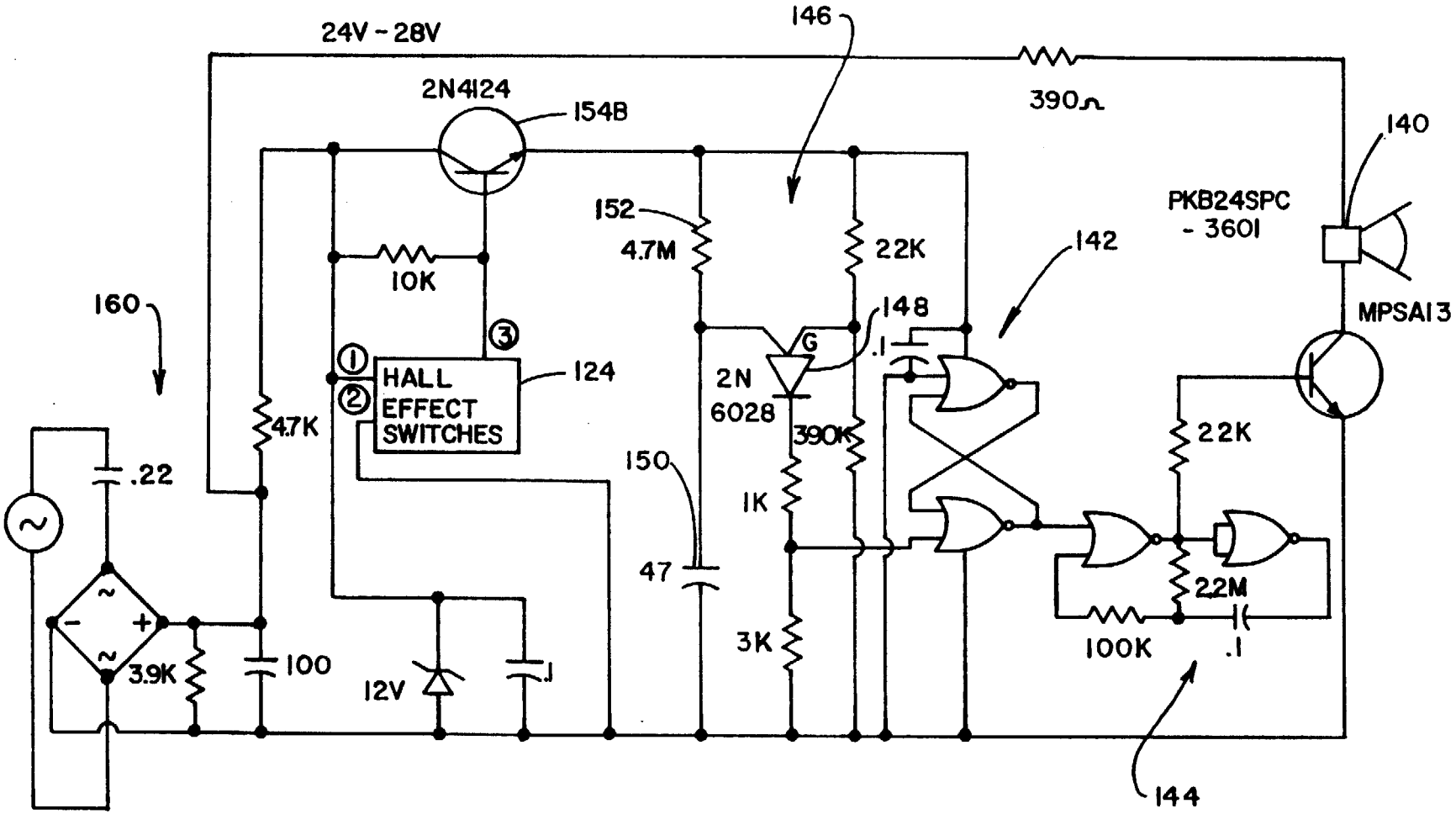
FIG. 9 is a schematic circuit diagram operable with the sensing element of FIG. 6.

The doors 100A, 100B include magnetic door sealing strips 114, 116 secured thereto for sealing the doors 100A, 100B to the cabinet 100C and for maintaining the doors 100A, 100B in closed positions adjacent the cabinet 100C. The sensing element 102 is installed into the cabinet 100C such that the first and second switch array means are generally adjacent sections of the magnetic sealing strips 114, 116 when the doors 100A, 100B are in closed positions. The first and second switch array means are operated by the magnetic sealing strips 114, 116 for signaling the opened/closed status of the doors 100B, 100A. Circuit means, as shown in FIGS. 8 and 9, are connected to the sensing element 102 for signaling a user of the refrigerator 100 if either one of the doors 100A or 100B remains in an opened position for a defined period of time.

Figure 5:
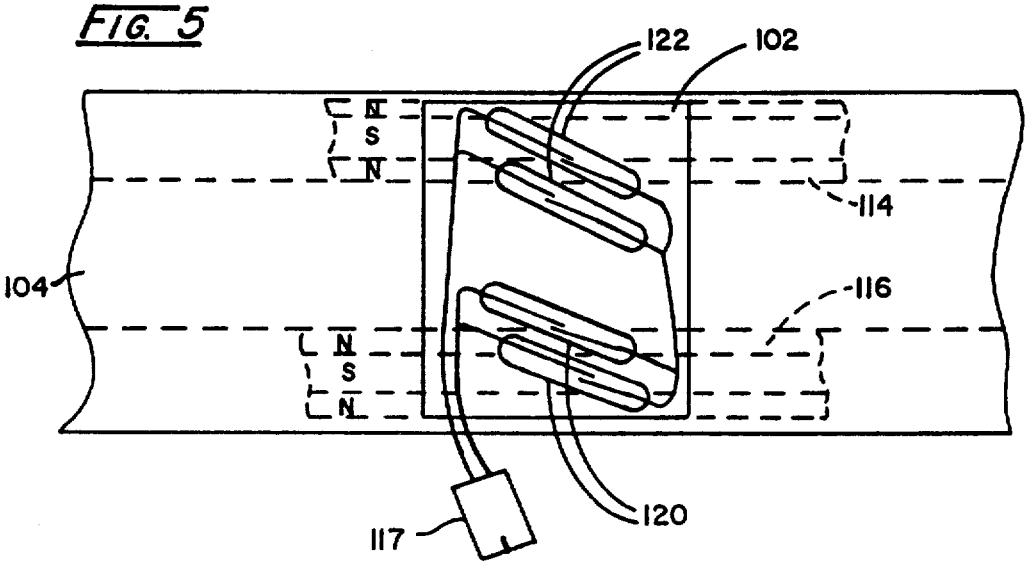
FIG. 5 shows a first embodiment of a sensing element in accordance with the present invention for monitoring two doors of a refrigerator.

Referring to FIG. 5, the first switch array means of the sensing element 102 may comprise at least two reed switches 120 which are electrically connected in parallel with one another. Reed switches having a sensitivity of 10–15 ampere turns have proved to be adequate for reliable operation by the magnetic door sealing strip 114, 116. In the preferred embodiment shown, the two reed switches 120 are physically positioned in parallel, adjacent one another and angularly oriented relative to the magnetic sealing strip 116 to accommodate a positional range of the door 100A and accordingly the magnetic sealing strip 116 relative to the cabinet 100C. This preferred arrangement allows only two reed switches 120 to be used for the first switch array means to accommodate a positional range of approximately 0.5 inch for the sealing strip 116. Alternately, at least two reed switches electrically connected in parallel and positioned side-by-side can be provided with the reed switches being generally axially aligned with the magnetic sealing strip 116, see FIG. 3; however, either a smaller positional range is accommodated or more than two reed switches are required for such alternate embodiments.

For monitoring both doors 100A, 100B of the two door refrigerator 100, the second switch array means of the sensing element 102 may comprises at least two reed switches 122 which are electrically connected in parallel with one another. In the preferred embodiment shown, the two reed switches 122 are physically positioned in parallel, adjacent one another and angularly oriented relative to the magnetic sealing strip 114 to accommodate a positional range of the door 100B and accordingly the magnetic sealing strip 114 relative to the cabinet 100C. This preferred arrangement allows only two reed switches 122 to be used for the second switch array means to accommodate a positional range of approximately 0.5 inch for the sealing strip 114.

Alternately, at least two reed switches electrically connected in parallel and positioned side-by-side can be provided with the reed switches generally axially aligned with the magnetic sealing strip 114, see FIG. 3; however, either a smaller positional range is accommodated or more than two reed switches are required for such alternate embodiments. The first and second switch array means are electrically connected in series and connected to an electrical plug 117 for easy electrical connection within the refrigerator 100. By thus connecting the first and second switch array means, the opening of either door 100A or 100B activates the circuit means for ultimately signalling a user of the refrigerator that a door has been open for a defined period of time. It should also be noted that no wires need to be inserted into the doors 100A, 100B for operation of the door ajar detection system.

The use of more than one reed switch and/or the angular orientation of those switches overcomes the problem of "dead spots" which are encountered in the centers of reed switches. As is known in the art, when a switch activating magnet reaches the dead spot of a reed switch, the switch opens. By properly selecting and positioning the reed switches, for example as described herein, when the magnet gets to the dead spot of one reed switch, another reed switch has already been operated such that no open circuit condition is presented by a switch array. Specific positioning and orientation depends on the reed switches selected and also the strength of the magnetic field available for activating the switches.

Figure 6:
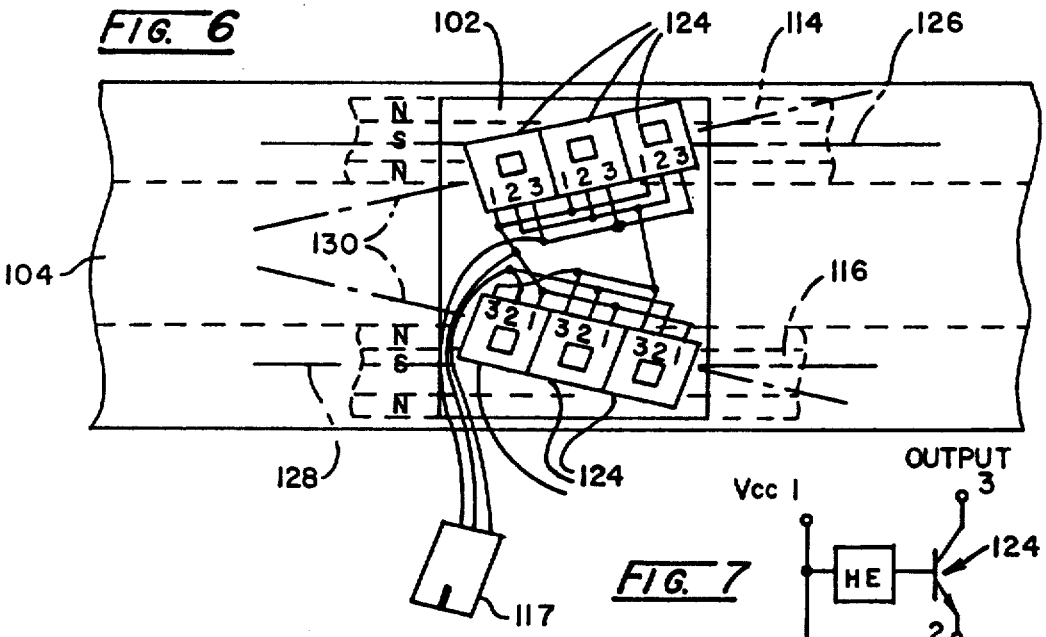
FIG. 6 shows a second embodiment of a sensing element in accordance with the present invention for monitoring two doors of a refrigerator.
Figure 7:
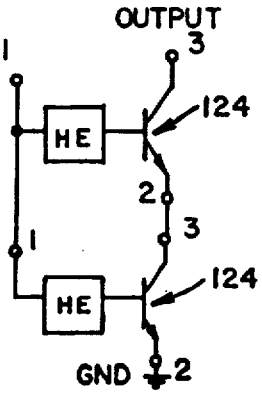
FIG. 7 shows the interconnection of Hall Effect switches used in the sensing element of FIG. 6.

The first and second switch array means may alternately each comprise at least two Hall Effect switches 124 electrically connected in parallel with one another, the at least two Hall Effect switches 124 being staggered relative to nominal centerlines 126, 128 of the magnetic sealing strips 114, 116 of the doors 100B, 100A to accommodate a positional range of the doors 100B, 100A and accordingly the magnetic sealing strips 114, 116 relative to the cabinet 100C, see FIG. 6. Preferably three Hall Effect switches 124 are aligned with one another along an axis 130 which is angularly oriented relative to the nominal centerlines 126, 128 to effect the staggered relation of the hall Effect switches 124 relative to the nominal centerlines 126, 128. The first and second switch array means may be generally parallel to one another as shown in FIG. 5, or can be oriented at different angles, even converging angles, as shown in FIG. 6. The Hall Effect devices 124 utilized in a working embodiment of the present invention are comercially available as UGN-3040T/U or UGS-3040T/U devices from the Sprague Electric Company. The Hall Effect devices 124 are connected as shown in FIGS. 6 and 7 for use in the present invention.

Since Hall Effect switches are polarity sensitive, they have to be positioned in accordance with the switch activating magnetic field. Also, since the sensing area is confined to a limited position of the component package, the configuration and orientation of the Hall Effect switches has to be such that as the sensed pole moves away from the sensing area of one switch, it enters the sensing area of another switch. Currently used magnetic sealing strips have a central southpole which is used for sensing in the preferred Hall Effect embodiment of the present invention. Thus, as illustrated, the angularly oriented array of three Hall Effect devices accommodates a positional range of approximately 0.5 inch for the sealing strips 114, 116.

Circuit means operable with the switch array means of FIGS. 5 and 6 are shown in FIGS. 8 and 9, respectively. The circuit means can be mounted to the rear of the refrigerator and conveniently connected to the switch array means by means of wires incorporated into a wiring harness for the refrigerator 100. The circuit means comprises signal means for alerting a person in the vicinity of the refrigerator that a door has been open for a defined period of time. The signal means may comprise a PKB24SPC-3601 buzzer 140 commercially available from Murata Erie North America Inc. or other audio and/or visual signaling devices. Storage means, comprising a flip-flop circuit 142 in the illustrated embodiments, is cleared by the associated switch array means upon opening of one of the doors 100A, 100B and set by the first one of a series of periodically occurring signal activation pulses. The flip-flop circuit 142 is connected to the buzzer 140 via an oscillator circuit 144 for intermittent operation of the buzzer 140 upon receipt of the first one of the periodically occurring series of signal activation pulses.

Oscillator means for generating the series of signal activation pulses having a period corresponding to the defined period of time before the buzzer 140 is activated comprises an oscillator circuit 146. The oscillator circuit 146 comprises a programmable unijunction transistor 148 controlled by the charging of a capacitor 150 which is charged through a resistor 152. The oscillator circuit 146 is connected to and activated by the corresponding sensing element 102 of FIG. 5 or FIG. 6 upon opening of one of the doors 100A, 100B. Control of the oscillator circuit 146 is performed by one of the sensing elements 102 by shorting out the base drive for a control transistor 154A or 154B as long as both doors 100A and 100B are closed and removing the base short if either or both doors 100A, 100b are opened. Power is provided to the circuits by a conventional ac-to-dc converter circuit 160. Upon generation of the first pulse by the oscillator circuit 146, the flip-flop circuit 142 is set which activates the oscillator circuit 144 intermittently driving the buzzer 140.

Having thus described the refrigerator door ajar system of the present invention in detail and by reference to preferred embodiments thereof, it will be apparent that modifications and variations are possible without departing from the scope of the invention defined in the appended claims.

What is claimed is:

1. A door status detection system for use in a refrigerator having a cabinet defining a food storage compartment and a door hingedly mounted to said cabinet for selectively closing said compartment, said door including a magnetic sealing strip secured thereto for sealing said door to said cabinet and for maintaining said door in a closed position, said door status detection system comprising:

switch array means installed into said cabinet generally adjacent a section of said magnetic sealing strip when said door is in a closed position for signaling the opened/closed status of said door, said switch array means being operated by said magnetic sealing strip; and circuit means connected to said switch array means for signaling a user of said refrigerator if said door remains in an opened position for a defined period of time.

2. A door status detection system for use in a refrigerator as claimed in claim 1 wherein said switch array means comprises at least two reed switches electrically connected in parallel with one another, said at least two reed switches being positioned side-by-side and generally axially aligned with said magnetic sealing strip to accommodate a positional range of said door and accordingly said magnetic sealing strip relative to said cabinet.

3. A door status detection system for use in a refrigerator as claimed in claim 2 wherein said at least two reed switches are positioned substantially parallel to one another.

4. A door status detection system for use in a refrigerator as claimed in claim 3 wherein said circuit means comprises:

signal means for alerting a person in the vicinity of said refrigerator that said door has been open for a defined period of time;

storage means connected to said signal means for activating said signal means upon receipt of a first one of a periodically occurring series of signal activation pulses; and oscillator means for generating said series of signal activation pulses having a period corresponding to said defined period of time, said oscillator means being connected to and activated by said switch array means upon opening of said door.

5. A door status detection system for use in a refrigerator as claimed in claim 4 wherein said storage means comprises a flip-flop circuit which is cleared by said switch array means upon opening of said door and set by the first one of said periodically occurring series of signal activation pulses.

6. A door status detection system for use in a refrigerator as claimed in claim 1 wherein said switch array means comprises at least two reed switches electrically connected in parallel with one another, said at least two reed switches being positioned adjacent one another and angularly oriented relative to said magnetic sealing strip to accommodate a positional range of said door and accordingly said magnetic sealing strip relative to said cabinet.

7. A door status detection system for use in a refrigerator as claimed in claim 6 wherein said at least two reed switches are positioned substantially parallel to one another.

8. A door status detection system for use in a refrigerator as claimed in claim 7 wherein said circuit means comprises:

signal means for alerting a person in the vicinity of said refrigerator that said door has been open for a defined period of time;

storage means connected to said signal means for activating said signal means upon receipt of a first one of a periodically occurring series of signal activation pulses; and oscillator means for generating said series of signal activation pulses having a period corresponding to said defined period of time, said oscillator means being connected to and activated by said switch array means upon opening of said door.

9. A door status detection system for use in a refrigerator as claimed in claim 8 wherein said storage means comprises a flip-flop circuit which is cleared by said switch array means upon opening of said door and set by the first one of said periodically occurring series of signal activation pulses.

10. A door status detection system for use in a refrigerator as claimed in claim 1 wherein said switch array means comprises at least two Hall Effect switches electrically connected in parallel with one another, said at least two Hall Effect switches being staggered relative to a nominal centerline of said magnetic sealing strip to accommodate a positional range of said door and accordingly said magnetic sealing strip relative to said cabinet.

11. A door status detection system for use in a refrigerator as claimed in claim 10 wherein said at least two Hall Effect switches are aligned with one another along an axis which is angularly oriented relative to said nominal centerline to effect the staggered relation of said Hall Effect switches relative thereto.

12. A door status detection system for use in a refrigerator as claimed in claim 11 wherein said circuit means comprises:

signal means for alerting a person in the vicinity of said refrigerator that said door has been open for a defined period of time;

storage means connected to said signal means for activating said signal means upon receipt of a first one of a periodically occurring series of signal activation pulses; and oscillator means for generating said series of signal activation pulses having a period corresponding to said defined period of time, said oscillator means being connected to and activated by said switch array means upon opening of said door.

13. A door status detection system for use in a refrigerator as claimed in claim 12 wherein said storage means comprises a flip-flop circuit which is cleared by said switch array means upon opening of said door and set by the first one of said periodically occurring series of signal activation pulses.

14. A door status detection system for use in a refrigerator having a cabinet defining first and second food storage compartments and corresponding first and second doors hingedly mounted to said cabinet for selectively closing said first and second compartments, respectively, said doors each including a magnetic sealing strip secured thereto for sealing said doors to said cabinet and for maintaining said doors in closed positions, said door status detection system comprising:

first and second switch array means installed into said cabinet generally adjacent a section of the magnetic sealing strips of said first and second doors, respectively, when said doors are in closed positions for signaling the opened/closed status of said doors, said first and second switch array means being electrically connected in series and operated by the magnetic sealing strips of said first and second doors, respectively; and circuit means connected to said first and second switch array means for signaling a user of said refrigerator if either of said doors remains in an opened position for a defined period of time.

15. A door status detection system for use in a refrigerator as claimed in claim 14 wherein said first and second switch array means each comprise at least two reed switches electricallyconnected in parallel with one another, said at least two reed switches being positioned side-by-side and generally axially aligned with the magnetic sealing strips of said first and second doors to accommodate a positional range of said doors and accordingly said magnetic sealing strips relative to said cabinet.

16. A door status detection system for use in a refrigerator as claimed in claim 15 wherein said circuit means comprises:

signal means for alerting a person in the vicinity of said refrigerator that one or both of said doors has been open for a defined period of time;

storage means connected to said signal means for activating said signal means upon receipt of a first one of a periodically occurring series of signal activation pulses; and oscillator means for generating said series of signal activation pulses said oscillator means being connected to and activated by said switch array means upon opening of either of said doors.

17. A door status detection system for use in a refrigerator as claimed in claim 16 wherein said storage means comprises a flip-flop circuit which is cleared by said switch array means upon opening of either of said doors and set by the first one of said periodically occurring series of signal activation pulses.

18. A door status detection system for use in a refrigerator as claimed in claim 14 wherein said first and second switch array means each comprise at least two Hall Effect switches electrically connected in parallel with one another, said at least two Hall Effect switches being staggered relative to a nominal centerline of the magnetic sealing strips of said first and second doors to accommodate a positional range of said doors and accordingly said magnetic sealing strips relative to said cabinet.

19. A door status detection system for use in a refrigerator as claimed in claim 18 wherein said circuit means comprises:

signal means for alerting a person in the vicinity of said refrigerator that one or both of said doors has been open for a defined period of time;

storage means connected to said signal means for activating said signal means upon receipt of a first one of a periodically occurring series of signal activation pulses; and oscillator means for generating said series of signal activation pulses, said oscillator means being connected to and activated by said switch array means upon opening of either of said doors.

20. A door status detection system for use in a refrigerator as claimed in claim 19 wherein said storage means comprises a flip-flop circuit which is cleared by said switch array means upon opening of either of said doors and set by the first one of said periodically occurring series of signal activation pulses.

*21. A door status sensing element for use in a refrigerator having a cabinet defining a food storage compartment and a door hingedly mounted to said cabinet for selectively closing said compartment, said door including a magnetic sealing strip secured thereto for sealing said door to said cabinet and for maintaining said door in a closed position, said sensing element comprising:*

*a housing installed into said cabinet and positioned generally adjacent a section of said magnetic sealing strip when said door is in a closed position; and*

*switch array means located in said housing and positioned generally adjacent a section of said magnetic sealing strip when said door is in a closed position for signaling the opened/closed status of said door, said switch array means being operated by said magnetic sealing strip for signaling the opened/closed status of said door.*

*22. A door status sensing element as set forth in claim 21, wherein said switch array means comprises at least two reed switches electrically connected in parallel with one another, said at least two reed switches being positioned side-by-side and generally axially aligned with said magnetic sealing strip to accommodate a positional range of said door and accordingly said magnetic sealing strip relative to said cabinet.*

*23. A door status sensing element as set forth in claim 22, wherein said at least two reed switches are positioned substantially parallel to one another.*

*24. A door status sensing element as set forth in claim 21, wherein said switch array means comprises at least two reed switches electrically connected in parallel with one another, said at least two reed switches being positioned adjacent one another and angularly oriented relative to said magnetic sealing strip to accommodate a positional range of said door and accordingly said magnetic sealing strip relative to said cabinet.*

*25. A door status sensing element as set forth in claim 24, wherein said at least two reed switches are positioned substantially parallel to one another.*

*26. A door status sensing element as set forth in claim 21, wherein said switch array means comprises at least two Hall Effect switches electrically connected in parallel with one another, said at least two Hall Effect switches being staggered relative to a nominal centerline of said magnetic sealing strip to accommodate a positional range of said door and accordingly said magnetic sealing strip relative to said cabinet.*

*27. A door status sensing element as set forth in claim 26, wherein said at least two Hall Effect switches are aligned with one another along an axis which is angularly oriented relative to said nominal centerline to effect the staggered relation of said Hall Effect switches relative thereto.*

*28. A door status sensing element for use in a refrigerator having a cabinet defining first and second food storage compartments and first and second doors hingedly mounted to said cabinet for selectively closing said first and second compartments, said doors each including a magnetic sealing strip secured thereto for sealing said doors to said cabinet and for maintaining said doors in closed positions, said sensing element comprising:*

*a housing installed into said cabinet generally adjacent a section of the magnetic sealing strips of said first and second doors, respectively, when said doors are in closed positions; and*

*first and second switch array means located in said housing and positioned generally adjacent a section of said magnetic sealing strips of said first and second doors, respectively, when said doors are in a closed position for signaling the opened/closed status of said doors.*

*29. A door status sensing element as set forth in claim 28, wherein said first and second switch array means each comprise at least two reed switches electrically connected in parallel with one another, said at least two reed switches being positioned side-by-side and generally axially aligned with the magnetic sealing strips of said first and second doors to accommodate a positional range of said doors and accordingly said magnetic sealing strips relative to said cabinet.*

*30. A door status sensing element as set forth in claim 28, wherein said first and second switch array means each comprise at least two Hall Effect switches electrically connected in parallel with one another, said at least two Hall Effect switches being staggered relative to nominal centerlines of said magnetic sealing strips of said first and second doors to accommodate a positional range of said doors and accordingly said magnetic sealing strips relative to said cabinet.*

*31. A door status sensing element as set forth in claim 30, wherein said at least two Hall Effect switches of said first switch array means are aligned with one another along an axis which is angularly oriented relative to the nominal centerline of said magnetic sealing strip of said first door to effect the staggered relation of said Hall Effect switches of said first switch array means relative thereto, and said at least two Hall Effect switches of said second switch array means are aligned with one another along an axis which is angularly oriented relative to the nominal centerline of said magnetic sealing strip of said second door to effect the staggered relation of said Hall Effect switches of said second switch array means relative thereto.*

*32. A door status sensing element as set forth in claim 28, wherein said first and second switch array means each comprise at least two reed switches electrically connected in parallel with one another, said at least two reed switches being positioned adjacent one another and angularly oriented relative to said magnetic sealing strips of said first and second doors to accommodate a positional range of said doors and accordingly said magnetic sealing strips relative to said cabinet.*

*33. A door status sensing element for use in a refrigerator having a cabinet defining a food storage compartment and a door hingedly mounted to said cabinet for selectively closing said compartment, said door including a magnetic sealing strip secured thereto for sealing said door to said cabinet and for maintaining said door in a closed position, said sensing element comprising:*

*first and second reed switches electrically connected in parallel with one another and positioned generally adjacent a section of said magnetic sealing strip when said door is in a closed position for signaling the opened/closed status of said door, said first and second reed switches being operated by said magnetic sealing strip for signaling the opened/closed status of said door.*

* * * * *